(12) United States Patent
Lyu et al.

(10) Patent No.: US 12,327,299 B2
(45) Date of Patent: Jun. 10, 2025

(54) FACIAL EXPRESSION IMAGE PROCESSING METHOD AND APPARATUS, AND ELECTRONIC DEVICE

(71) Applicant: BEIJING BYTEDANCE NETWORK TECHNOLOGY CO., LTD., Beijing (CN)

(72) Inventors: Shaohui Lyu, Beijing (CN); Hui Yang, Beijing (CN); Guangyao Ni, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 851 days.

(21) Appl. No.: 17/426,840

(22) PCT Filed: Dec. 27, 2019

(86) PCT No.: PCT/CN2019/129140
§ 371 (c)(1),
(2) Date: Jul. 29, 2021

(87) PCT Pub. No.: WO2020/155984
PCT Pub. Date: Aug. 6, 2020

(65) Prior Publication Data
US 2022/0207917 A1 Jun. 30, 2022

(30) Foreign Application Priority Data
Jan. 31, 2019 (CN) .......................... 201910101335.5

(51) Int. Cl.
*G06T 11/00* (2006.01)
*G06T 3/40* (2006.01)
(Continued)

(52) U.S. Cl.
CPC .............. *G06T 11/00* (2013.01); *G06T 3/40* (2013.01); *G06V 10/70* (2022.01); *G06V 40/161* (2022.01); *G06V 40/168* (2022.01); *G06V 40/174* (2022.01)

(58) Field of Classification Search
CPC ... G06T 11/00; G06T 3/40; G06T 5/00; G06T 5/77; G06V 10/70; G06V 40/161; G06V 40/168; G06V 40/174
See application file for complete search history.

(56) References Cited

U.S. PATENT DOCUMENTS 11,182,591 B2 * 11/2021 Jin ........................ G06V 40/172
11,455,729 B2 * 9/2022 Gao ...................... G06V 40/174
(Continued)

FOREIGN PATENT DOCUMENTS

| CN | 104780339 A | 7/2015 |
|----|-------------|--------|
| CN | 104780458 A | 7/2015 |

(Continued)

OTHER PUBLICATIONS

International Patent Application No. PCT/CN2019/129140; Int'l Search Report; dated Mar. 26, 2020; 3 pages.
(Continued)

*Primary Examiner* — Bobbak Safaipour
(74) *Attorney, Agent, or Firm* — BakerHostetler

(57) ABSTRACT

A method and an apparatus for processing a facial expression image, an electronic device and a computer-readable storage medium are provided. The method includes: acquiring a first image, the first image comprising a facial image; recognizing a facial expression of the facial image; performing, in response to recognizing the facial expression as a first facial expression, a first processing on the facial image to acquire a first facial image; and covering the first facial image at a position of the facial image, to acquire a first (Continued)

image effect. Generation of a facial image effect is controlled based on a facial expression, thereby solving the technical problem that the image effect is complicated to produce and is fixed since the processing effect cannot be flexibly configured.

20 Claims, 5 Drawing Sheets

(51) Int. Cl.
  *G06V 10/70* (2022.01)
  *G06V 40/16* (2022.01)

(56) References Cited

U.S. PATENT DOCUMENTS

| | | | | |
|---|---|---|---|---|
| 2012/0113211 | A1* | 5/2012 | Yi | G06F 3/0481 |
| | | | | 348/14.07 |
| 2017/0024005 | A1* | 1/2017 | Liu | G06F 3/04845 |
| 2018/0068482 | A1* | 3/2018 | Yam | G06T 13/80 |
| 2018/0115746 | A1 | 4/2018 | Wang | |
| 2018/0204052 | A1* | 7/2018 | Li | G06T 3/18 |
| 2019/0050548 | A1* | 2/2019 | Zhang | G06V 40/169 |
| 2019/0116323 | A1* | 4/2019 | Kim | H04N 5/2621 |
| 2019/0220661 | A1* | 7/2019 | Wang | G02B 5/08 |
| 2019/0251336 | A1* | 8/2019 | Wu | G06F 18/22 |
| 2019/0294860 | A1* | 9/2019 | Jin | G06V 40/172 |
| 2020/0074149 | A1* | 3/2020 | Zhang | G06V 10/764 |
| 2020/0380682 | A1* | 12/2020 | Gao | G06V 10/754 |
| 2021/0022662 | A1* | 1/2021 | Hyun | G16H 30/20 |
| 2021/0029305 | A1* | 1/2021 | Tang | H04N 23/633 |
| 2021/0339755 | A1* | 11/2021 | Inagaki | G06V 20/597 |
| 2021/0366163 | A1* | 11/2021 | Lin | G06T 11/00 |
| 2021/0397822 | A1* | 12/2021 | Zhang | G06V 10/82 |
| 2021/0406305 | A1* | 12/2021 | Shen | G06F 16/686 |
| 2022/0101652 | A1* | 3/2022 | Lyu | G06V 10/751 |

FOREIGN PATENT DOCUMENTS

| | | |
|---|---|---|
| CN | 106372622 A | 2/2017 |
| CN | 107705356 A | 2/2018 |
| CN | 108022206 A | 5/2018 |
| CN | 108198159 A | 6/2018 |
| CN | 108229269 A | 6/2018 |
| CN | 108495049 A | 9/2018 |
| CN | 108734126 A | 11/2018 |
| CN | 108830784 A | 11/2018 |
| CN | 108985241 A | 12/2018 |
| CN | 109034063 A | 12/2018 |

OTHER PUBLICATIONS

Zhang Zhao-Xu; "Research on Feature Extraction Based on CNN Deep Learning Model"; CNN; Mar. 2016; p. 41-44 (English Abstract on p. 44).
Zhou et al.; "A Survey of Human Face Detection"; Institute of Artificial Intelligence & Robotics; Oct. 2014; 4 pages (contains English Abstract).
International Preliminary Report on Patentability for International Application No. PCT/CN2019/129140, mailed Aug. 12, 2021, 11 Pages.
International Search Report for International Application No. PCT/CN2021/117199, mailed Dec. 17, 2021, 2 pages.
Notice of First Examination Opinion for Chinese Application No. 201910101335.5, mailed Nov. 10, 2021, 9 Pages.
Rejection Decision for Chinese Application No. 201910101335.5, mailed Aug. 5, 2022, 5 Pages.
Written Opinion for International Application No. PCT/CN2019/129140, mailed Mar. 26, 2020, 7 Pages.

* cited by examiner

FACIAL EXPRESSION IMAGE PROCESSING METHOD AND APPARATUS, AND ELECTRONIC DEVICE

The present application is the national phase of International Application No. PCT/CN2019/129140, titled "FACIAL EXPRESSION IMAGE PROCESSING METHOD AND APPARATUS, AND ELECTRONIC DEVICE", filed on Dec. 27, 2019, which claims priority to Chinese Patent Application No. 201910101335.5, titled "FACIAL EXPRESSION IMAGE PROCESSING METHOD AND APPARATUS, AND ELECTRONIC DEVICE", filed on Jan. 31, 2019 with the China National Intellectual Property Administration, both of which are incorporated herein by reference in their entireties.

FIELD

The present disclosure relates to the field of image processing, and in particular to a method and an apparatus for processing a facial expression image, an electronic device and a computer-readable storage medium.

BACKGROUND

With the development of computer technologies, intelligent terminals are widely used for various purposes, such as listening to music, playing games, chatting online and taking images. The intelligent terminals have achieved a high imaging definition above 10 million pixels, which is comparable to that of a professional camera.

Currently, when using the intelligent terminal to take images, conventional imaging effects can be achieved with built-in camera software embedded at the factory, and additional image effects can be achieved by using an application (APP) downloaded from the network, such as APPs capable of implementing dark light detection, beauty camera and super pixel. The combination of a variety of basic facial expression image processing can form a variety of special effects, such as beautifying, applying filters, enlarging eyes and thinning faces.

The conventional special effects of the image are generally obtained by performing post-processing on the image by using special effect resources, such as processing faces in a video in post-production. However, this method is complex and takes a lot of time. In the conventional technology, fixed processing may be performed on a video image in real time, such as applying filters and beautifying faces. However, such fixed processing cannot be flexibly configured to achieve different processing results.

SUMMARY

In a first aspect, a method for processing a facial expression image is provided according to an embodiment of the present disclosure. The method includes:
  acquiring a first image, the first image including a facial image;
  recognizing a facial expression of the facial image;
  performing, in response to recognizing the facial expression as a first facial expression, a first processing on the facial image to acquire a first facial image; and
  covering the first facial image at a position of the facial image, to acquire a first image effect.
  Further, the acquiring a first image, the first image including a facial image includes:
  acquiring a first video, where at least one of video frames in the first video includes the facial image.
  Further, the recognizing a facial expression of the facial image includes:
  recognizing the facial image in the first image;
  extracting a feature of the facial expression from the facial image; and
  recognizing the facial expression based on the feature of the facial expression.
  Further, the performing, in response to recognizing the facial expression as a first facial expression, a first processing on the facial image to acquire a first facial image includes:
  acquiring a processing configuration file corresponding to the first facial expression, in response to recognizing the facial expression as the first facial expression; and
  performing the first processing on the facial image based on the processing configuration file to acquire the first facial image.
  Further, the acquiring a processing configuration file corresponding to the first facial expression, in response to recognizing the facial expression as the first facial expression includes:
  recognizing the facial expression as the first facial expression; and
  acquiring the processing configuration file corresponding to the first facial expression, in a case that a level of the first facial expression reaches a preset level.
  Further, the acquiring a processing configuration file corresponding to the first facial expression, in response to recognizing the facial expression as the first facial expression includes:
  recognizing the facial expression as the first facial expression;
  acquiring the processing configuration file corresponding to the first facial expression;
  determining a level of the first facial expression; and
  setting a processing parameter in the processing configuration file based on the level of the first facial expression.
  Further, the performing the first processing on the facial image based on the processing configuration file to acquire the first facial image includes:
  segmenting the facial image from the first image; and
  enlarging the facial image segmented from the first image based on the processing configuration file, to acquire an enlarged facial image.
  Further, the covering the first facial image at a position of the facial image, to acquire a first image effect includes:
  acquiring a first positioning feature point on the first facial image and a second positioning feature point on the facial image; and
  covering the first facial image on the facial image, and causing the first positioning feature point and the second positioning feature point to coincide with each other, to acquire the first image effect.
  Further, the acquiring a first image, the first image including a facial image includes: acquiring the first image, the first image including at least two facial images.
  Further, the recognizing a facial expression of the facial image includes:
  respectively recognizing facial expressions of the at least two facial images.
  Further, the performing, in response to recognizing the facial expression as a first facial expression, a first processing on the facial image to acquire a first facial image includes:

performing, in response to recognizing at least one of the facial expressions as the first facial expression, the first processing on the facial image corresponding to the first facial expression to acquire at least one first facial image.

Further, the performing, in response to recognizing at least one of the facial expressions as the first facial expression, the first processing on the facial image corresponding to the first facial expression to acquire at least one first facial image includes:

in response to recognizing the at least one of the facial expressions as the first facial expression, acquiring a first processing configuration file corresponding to the first facial expression of the facial image; and performing the first processing on the facial image corresponding to the first facial expression, based on the first processing configuration file to acquire the at least one first facial image.

Further, the covering the first facial image at a position of the facial image, to acquire a first image effect includes:

covering the at least one first facial image at a position of the facial image corresponding to the at least one first facial image, to acquire the first image effect.

In a second aspect, an apparatus for processing a facial expression image is provided according to an embodiment of the present disclosure. The apparatus includes a first image acquisition module, a facial expression recognition module, a first processing module, and a facial expression image processing module.

The first image acquisition module is configured to acquire a first image, the first image including a facial image.

The facial expression recognition module is configured to recognize a facial expression of the facial image.

The first processing module is configured to perform, in response to recognizing the facial expression as a first facial expression, a first processing on the facial image to acquire a first facial image.

The facial expression image processing module is configured to cover the first facial image at a position of the facial image, to acquire a first image effect.

Further, the first image acquisition module includes a first video acquisition module configured to acquire a first video. At least one of video frames in the first video includes the facial image.

Further, the facial expression recognition module includes a face recognition module, an expression feature extraction module, and an expression recognition sub-module.

The face recognition module is configured to recognize the facial image in the first image.

The expression feature extraction module is configured to extract a feature of the facial expression from the facial image.

The expression recognition sub-module is configured to recognize the facial expression based on the feature of the facial expression.

Further, the first processing module includes a processing configuration file acquisition module and a first facial image processing module.

The processing configuration file acquisition module is configured to acquire a processing configuration file corresponding to the first facial expression, in response to recognizing the facial expression as the first facial expression.

The first facial image processing module is configured to perform the first processing on the facial image based on the processing configuration file to acquire the first facial image.

Further, the processing configuration file acquisition module includes a first facial expression recognition module and a first processing configuration file acquisition module.

The first facial expression recognition module is configured to recognize the facial expression as the first facial expression.

The first processing configuration file acquisition module is configured to acquire the processing configuration file corresponding to the first facial expression, in a case that a level of the first facial expression reaches a preset level.

Further, the processing configuration file acquisition module includes a second facial expression recognition module, a second processing configuration file acquisition module, an expression level determination module, and a processing parameter setting module.

The second facial expression recognition module is configured to recognize the facial expression as the first facial expression.

The second processing configuration file acquisition module is configured to acquire the processing configuration file corresponding to the first facial expression.

The expression level determination module is configured to acquire the processing configuration file corresponding to the first facial expression.

The processing parameter setting module is configured to set a processing parameter in the processing configuration file based on the level of the first facial expression.

Further, the first facial image processing module includes a face segmentation module and an enlargement module.

The face segmentation module is configured to segment the facial image from the first image.

The enlargement module is configured to enlarge the facial image segmented from the first image based on the processing configuration file, to acquire an enlarged facial image.

Further, the facial expression image processing module includes a positioning feature point acquisition module and a covering module.

The positioning feature point acquisition module is configured to acquire a first positioning feature point on the first facial image and a second positioning feature point on the facial image.

The covering module is configured to cover the first facial image on the facial image, and cause the first positioning feature point and the second positioning feature point to coincide with each other, to acquire the first image effect.

In a third aspect, an apparatus for processing a facial expression image is provided according to an embodiment of the present disclosure. The apparatus includes a second image acquisition module, a third facial expression recognition module, a second processing module, and a first facial expression image processing module.

The second image acquisition module is configured to acquire the first image. The first image includes at least two facial images.

The third facial expression recognition module is configured to respectively recognize facial expressions of the at least two facial images.

The second processing module is configured to perform, in response to recognizing at least one of the facial expressions as the first facial expression, the first processing on the facial image corresponding to the first facial expression to acquire at least one first facial image.

The first facial expression image processing module is configured to cover the at least one first facial image at a position of the facial image corresponding to the at least one first facial image, to acquire the first image effect.

Further, the second processing module includes a corresponding processing configuration file acquisition module and a second processing sub-module.

The corresponding processing configuration file acquisition module is configured to, in response to recognizing the at least one of the facial expressions as the first facial expression, acquire a first processing configuration file corresponding to the first facial expression of the facial image.

The second processing sub-module is configured to perform the first processing on the facial image corresponding to the first facial expression, based on the first processing configuration file to acquire the at least one first facial image.

In a fourth aspect, an electronic device is provided according to an embodiment of the present disclosure. The electronic device includes at least one processor and a memory in communicational connection with the at least one processor.

The memory stores instructions executable by the at least one processor. The instructions, when executed by the at least one processor, causes the at least one processor to perform the method for processing a facial expression image according to any one of the first aspect.

In a fifth aspect, a non-transitory computer readable storage medium is provided. The non-transitory computer readable storage medium store computer instructions. The computer instructions are configured to cause a computer to perform the method for processing a facial expression image according to any one of the first aspect.

A method and an apparatus for processing a facial expression image, an electronic device and a computer readable storage medium are provided. The method for processing a facial expression image includes: acquiring a first image, the first image including a facial image; recognizing a facial expression of the facial image; performing, in response to recognizing the facial expression as a first facial expression, a first processing on the facial image to acquire a first facial image; and covering the first facial image at a position of the facial image, to acquire a first image effect. According to the embodiments of the present disclosure, generation of a facial image effect is controlled based on a facial expression, so as to solve the technical problem in the conventional technology that the image effect is complicated to produce and is fixed since the processing effect cannot be flexibly configured.

The above description is merely an overview of technical solutions of the present disclosure. In order to make technical means of the present disclosure more clear so as to be implemented according to the present disclosure, and make the above and other purposes, features and advantages better understood, preferred embodiments are described in detail below in conjunction with drawings.

BRIEF DESCRIPTION OF THE DRAWINGS

The drawings to be used in the description of the embodiments or the conventional technology will be described briefly as follows, so that the technical solutions according to the embodiments of the present disclosure or according to the conventional technology will become clearer. It is apparent that the drawings in the following description only illustrate some embodiments of the present disclosure. For those skilled in the art, other drawings may be obtained according to these drawings without any creative work.

DETAILED DESCRIPTION

Embodiments of the present disclosure are described with specific examples hereinafter. Those skilled in the art may easily learn about other advantages and effects of the present disclosure from details disclosed in the present specification. Apparently, embodiments described below are merely some embodiments rather than all embodiments of the present disclosure. The present disclosure may be implemented or applied in other different embodiments. Details of the present specification may be modified or changed based on different viewpoints and applications without departing from the spirit of the present disclosure. It should be noted that embodiments below and features in the embodiments may be combined with each other if there is no conflict. Any other embodiments obtained by those skilled in the art based on the embodiments in the present disclosure without any creative effort fall within the protection scope of the present disclosure.

It should be noted that, various aspects of embodiments in the scope of the attached claims are described below. Apparently, the various aspects described herein may be implemented in various forms, and any specific structures and/or functions described herein are only illustrative. According to the present disclosure, those skilled in the art should know that any aspects described herein may be implemented independently from other aspects or may be implemented in combination with one or more other aspects in various ways. For example, apparatuses and/or methods may be implemented by using any number of aspects of the present specification. In addition, other structures and/or functions than one or more aspects of the present disclosure may be used to implement the apparatus and/or method.

It should be noted that, the drawings provided in the following embodiments are merely used to schematically explain basic elements of the present disclosure. The drawings only show elements relating to the present disclosure and are not drawn according to actual number, shape and size of the elements. The shape, number and scale of each element in practical implementations may be changed optionally and the configuration of the elements may be more complex.

Moreover, in the following description, specific details are provided for better understanding of the embodiments. However, those skilled in the art should understand that the aspects of the present disclosure may be implemented without the specific details.

Figure 1:
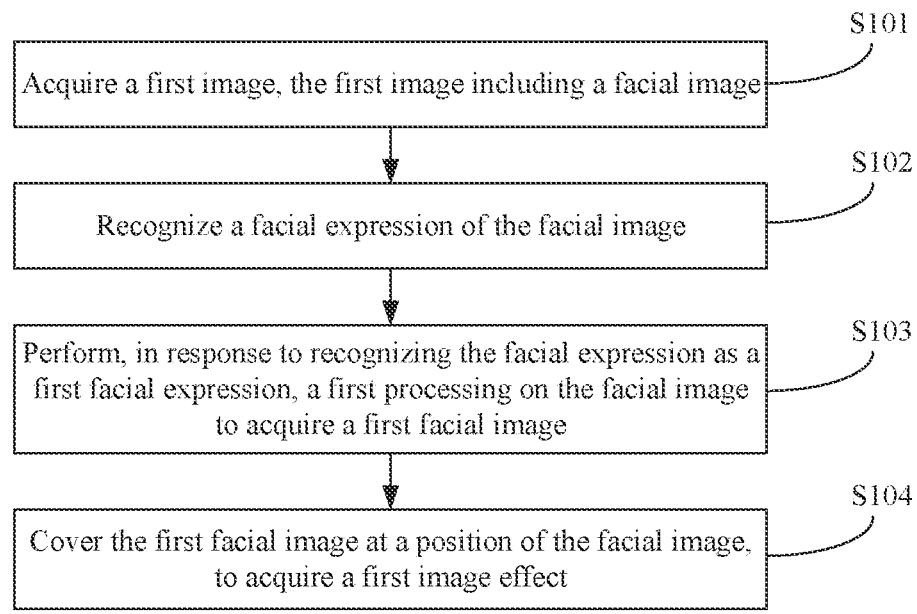
FIG. 1 is a flow char of a method for processing a facial expression image according to a first method embodiment of the present disclosure.

FIG. 1 is a flow char of a method for processing a facial expression image according to a first method embodiment of the present disclosure. The method for processing a facial expression image according to the embodiment of the present disclosure may be implemented by an apparatus for processing a facial expression image. The apparatus for processing a facial expression image may be implemented as software, or a combination of hardware and software. The apparatus for processing a facial expression image may be integrated in a device of a system for processing a facial expression image, such as a server for processing a facial expression image or a terminal device for processing a facial expression image. As shown in FIG. 1, the method includes the following steps S101 to S104.

In step S101, a first image is acquired, where the first image includes a facial image.

In an embodiment, the first image may be acquired from a local storage or a network storage. A storage address of the first image is acquired before the first image is acquired, and then the first image is acquired according to the storage address. The first image may be a video image, a picture, or a picture with dynamic effects, which is not described in detail herein.

In an embodiment, the acquiring the first image includes acquiring a first video, and at least one of video frames in the first video includes the facial image. In the embodiment, the first video may be acquired by an image sensor. The image sensor refers to various devices capable of acquiring images. A typical image sensor is a video camera, a camera, a webcam, and the like. In the embodiment, the image sensor may be a camera on a mobile terminal, such as a front camera or a rear camera on a smartphone. The video image acquired by the camera may be directly displayed on a display screen of the smartphone. In this step, the video image acquired by the image sensor is acquired and is used for further image recognition in the next step.

In this step, the first image includes the facial image. The facial image is a basis of a facial expression. In this embodiment, in a case that the first image is a picture, the picture includes at least one facial image. In a case that the first image is a video, at least one of video frames in the first image includes at least one facial image.

In step S102, a facial expression of the facial image is recognized.

In an embodiment, the recognizing the facial expression of the facial image includes: recognizing the facial image in the first image; extracting a feature of the facial expression from the facial image; and recognizing the facial expression based on the feature of the facial expression.

First, a face in the image is detected. The face detection is a process of searching any given image or a group of image sequences according to a certain strategy to determine locations and regions of all faces, so as to determine whether a face exists in various images or image sequences, and determine the number and spatial distribution of the face. There are four type of methods for detecting a face: (1) a knowledge-based method, in which typical faces are encoded to form a rule base, and a face is located according to a relationship between facial features; (2) a feature invariant method, in which a stable feature is found in a case that a post, a viewing angle or a lighting condition changes, and such feature is used to determine a face; (3) a template matching method, in which several standard face patterns are stored to respectively describe the entire face and facial features, and a relationship between an inputted image and the stored patterns is calculated for detection; and (4) an appearance-based method that opposite to the template matching method, in which models are acquired by learning from a training image set for detection. An implementation of the method (4) is used to illustrate the process of face detection. First, a feature is extracted for modeling. In the embodiment, a Haar feature serves as a key feature for determining a face. The Haar feature is a simple rectangular feature that can be extracted rapidly. A feature template for calculating the Haar feature generally includes a simple rectangular combination formed by two or more congruent rectangles, that include black rectangles and white rectangles. Some key features among a large number of Haar features are found by using the AdaBoost algorithm and are used to generate an effective classifier. The generated classifier is used for detecting the face in the image. During face detection, multiple facial feature points may be detected, and typically 106 facial feature points may be used to recognize the face.

After the facial image is detected, preprocessing may be performed on the facial image to facilitate subsequent recognition of the facial expression. The quality of the preprocessing performed on the image directly affects accuracy of extracting the feature of the facial expression and the effect of expression classification, thereby affecting accuracy of recognition of the facial expression. The preprocessing of the facial image mainly includes de-noising, scale normalization, and grayscale normalization. The inputted image generally includes a complex scene. Generally, facial images acquired by face detection have different sizes, length-to-width ratios, and lighting conditions, whether parts of the facial images are covered varies among the facial images, and heads in the facial images have different deflections. Therefore, for subsequent uniform processing of extracting the feature, normalization processing is performed on the sizes, the lighting conditions and the head postures of the facial images to improve the quality of the facial images, for further analysis and understanding of the facial expression.

After the preprocessing, the feature of the facial expression is extracted. There are many methods for extracting the feature of the facial expression. The methods may be classified into a motion-based method and a deformation-based method for extracting a feature of a facial expression according to whether a source of the facial image is static or dynamic. In the motion-based method for extracting a feature, a change of the expression is described according to changes of relative positions and distances of facial feature points in image sequences. The motion-based method includes an optical flow method, a motion model, a feature point tracking algorithm and the like, that have good robustness. The deformation-based method for extracting a feature is mainly used to extract a feature of a static image by acquiring a model feature by comparing with an appearance or a texture of a natural expression model. Typical algorithms of the deformation-based method include an active appearance model (AAM), a point distribution model (PDM), a texture feature-based Gabor transform and a local binary pattern (LBP).

After the feature of the facial expression is extracted, the facial expression is classified. The expression classification includes inputting the feature of the facial expression extracted in the previous step into a trained classifier or a regression classifier, to obtain a predicted value, so as to determine an expression category corresponding to the feature of the facial expression. Currently, common algorithms for expression classification include a linear classifier, a neural network classifier, a support vector machine SVM, a hidden Markov model, and the like.

It should be understood that the method of the face detection, the preprocessing of the facial image, the extraction of the feature of the facial expression and the classification of the facial expression described above are examples for ease of understanding. Actually, any method for recognizing the facial expression may be applied in the technical solution of the present disclosure, and is not described in detail herein.

In step S103, in response to recognizing the facial expression as a first facial expression, a first processing is performed on the facial image to acquire a first facial image.

In an embodiment, the performing, in response to recognizing the facial expression as a first facial expression, a first processing on the facial image to acquire a first facial image includes: acquiring a processing configuration file corresponding to the first facial expression, in response to recognizing the facial expression as the first facial expression; and performing the first processing on the facial image based on the processing configuration file to acquire the first facial image. In the embodiment, the facial expression may include various facial expressions, such as a smiling expression, a sad expression, an angry expression, and the like. For the various facial expressions, different processing configuration files may be set, so as to perform different processing on the various facial expressions. In an embodiment, in a case that the facial expression is recognized as the smiling expression, enlargement processing is performed on the face to acquire an enlarged face. In an embodiment, in a case that the facial expression is recognized as the sad expression, a tear drop sticker or a dark cloud lightning sticker is added to the face to acquire a face with a sticker. In an embodiment, in a case that the facial expression is recognized as the angry expression, the face is rendered red and nostrils are enlarged.

In an embodiment, the acquiring a processing configuration file corresponding to the first facial expression, in response to recognizing the facial expression as the first facial expression includes: recognizing the facial expression as the first facial expression; and acquiring the processing configuration file corresponding to the first facial expression, in a case that a level of the first facial expression reaches a preset level. In the embodiment, after the facial expression is recognized, the level of the facial expression is further determined. The level of the facial expression represents a degree of the facial expression. Taking the smiling expression as an example, smile is a lower level of smiling expression, and laugh is a higher level of smiling expression. Other facial expressions can be treated in a similar manner. In the embodiment, the determining the level of the facial expression includes: comparing the facial expression with preset expression templates; and determining a level of one of the expression templates with a highest matching degree with the facial expression as the level of the facial expression. In an embodiment, in a case that the facial expression is the smiling expression, the smiling expression may be assigned with multiple levels, such as 100 levels, and each level corresponds to a standard facial expression image template. When determining the level of the facial expression, the recognized facial expression is compared with the facial expression image templates corresponding to the 100 levels, and the level of one of the facial expression image templates with the highest matching degree is determined as the level of the facial expression. In an embodiment, the determining the level of the facial expression includes: comparing the facial expression with a preset expression template; and determining a similarity between the facial expression and the preset expression template as the level of the facial expression. In the embodiment, the number of the facial expression image template may be one, and the recognized facial expression is compared with the facial expression image template. A result of the comparison is a similarity percentage. For example, if the similarity between the facial expression and the facial expression image template is 90%, the level of the facial expression is determined to be 90. In the embodiment, an expression level is set in advance. The expression level is a condition for triggering the first processing. In an embodiment, the preset expression level of the smiling expression is set to 50. In a case that the recognized first expression is determined to be a smiling expression having a level above 50, a processing configuration file corresponding to the smiling expression is acquired.

In an embodiment, the acquiring a processing configuration file corresponding to the first facial expression, in response to recognizing the facial expression as the first facial expression includes: recognizing the facial expression as the first facial expression; acquiring the processing configuration file corresponding to the first facial expression; determining a level of the first facial expression; and setting a processing parameter in the processing configuration file based on the level of the first facial expression. In the embodiment, the level of the first facial expression may be determined by using the same method as that in the above embodiment. The method is not repeated here. In the embodiment, the processing parameter in the processing configuration file is set according to the level of the first facial expression, so that effect of the processing may be controlled according to the expression. In an embodiment, if the first facial expression is the smiling expression, in a case that the smiling expression is recognized, a processing configuration file corresponding to the smiling expression is acquired. The processing configuration file is configured for matting and enlarging a face, where an enlargement coefficient is set to control an enlargement ratio. In this case, the level of the smiling expression may be used to control the enlargement ratio, where the level of the smiling expression may be directly used as the enlargement ratio, or the level may have a certain correspondence with the enlargement ratio. In an embodiment, the smiling expression having a level from 1 to 10 is enlarged by 1 times, and the smiling expression having a level from 11 to 20 is enlarged by 1.1 times, and so on. A higher level of the smiling expression of the face corresponds to a higher enlargement ratio. It should be understood that the above expressions, levels, and processing parameters are examples, and are not intended to limit the present disclosure. In fact, the level of the expression can be used to control any processing parameter to form a variety of control effects, which will not be described in detail here.

In an embodiment, the performing the first processing on the facial image based on the processing configuration file to acquire the first facial image includes: segmenting the facial image from the first image; and enlarging the facial image segmented from the first image based on the processing configuration file, to acquire an enlarged facial image. In the embodiment, the facial image may be segmented from the first image according to a face contour recognized in step S102 to form a matting effect. Preprocessing may be performed on the facial image segmented from the first image to obtain a more natural image. The preprocessing performed on the facial image may include blurring the contour of the facial image. Any blurring method may be used for the blurring. An optional blurring method is Gaussian blur. It should be understood that, any blurring method can be used for the blurring in the present disclosure, and is not described in detail herein.

The enlargement processing may include calculating a position of a pixel in an original image based on a position of the pixel in the enlarged image, and obtaining a color value of the pixel in the enlarged image by interpolation. For example, assuming that a position of a pixel in the original image is (x, y), and a position of the pixel in the enlarged image is (u, v), the position (x, y) corresponding to the position (u, v) is calculated by using the following equation 1:

$$\begin{bmatrix} x \\ y \end{bmatrix} = \begin{bmatrix} \alpha_1 & 0 \\ 0 & \alpha_2 \end{bmatrix}^{-1} * \begin{bmatrix} u \\ v \end{bmatrix}.$$

In the above equation, $\alpha\_1$ is an enlargement ratio of the pixel in the x-axis direction, $\alpha\_2$ is an enlargement ratio of the pixel in the y-axis direction. Generally, $\alpha\_1=\alpha\_2$. For example, an image of 100*100 is enlarged to an image of 200*200. However, $\alpha\_1$ may be unequal to $\alpha\_2$. For example, an image of 100*100 is enlarged to an image of 200*300. The following show a calculation example, where coordinates of a pixel in the enlarged image are (10, 20), and the enlargement ratios in the x-axis direction and in the y-axis direction are both 2, the position of the pixel in the original image may be obtained as:

$$\begin{bmatrix} x \\ y \end{bmatrix} = \begin{bmatrix} 2 & 0 \\ 0 & 2 \end{bmatrix}^{-1} * \begin{bmatrix} 10 \\ 20 \end{bmatrix} = \begin{bmatrix} \frac{1}{2} & 0 \\ 0 & \frac{1}{2} \end{bmatrix} * \begin{bmatrix} 10 \\ 20 \end{bmatrix} = \begin{bmatrix} 5 \\ 10 \end{bmatrix}.$$

As can be seen, the pixel (10, 20) in the enlarged image corresponding to the pixel (5, 10) in the original image. In this case, the color value of the pixel (5, 10) in the original image is assigned to the pixel (10, 20) in the enlarged image. In an embodiment, in order to obtain a smooth image, the color value of the pixel (x, y) in the original image is smoothed and is assigned to the pixel in the enlarged image. In an embodiment, an average color value of 2*2 pixels neighboring the pixel (x, y) is assigned to the pixel in the enlarged image corresponding to the pixel (x, y).

It should be understood that the above expressions and processing in the embodiment are examples, and are not intended to limit the present disclosure. In fact, any expression and processing are applicable to the technical solution of the present disclosure.

In step S104, the first facial image is covered at a position of the facial image, to acquire a first image effect.

In this step, the first facial image obtain in step S103 by performing the first processing is covered at a position of the facial image, to acquire the first image effect.

In an embodiment, the covering the first facial image at a position of the facial image, to acquire a first image effect includes: acquiring a first positioning feature point on the first facial image and a second positioning feature point on the facial image; and covering the first facial image on the facial image, and causing the first positioning feature point and the second positioning feature point to coincide with each other, to acquire the first image effect. In the embodiment, the first positioning feature point and the second positioning feature point may be central feature points on the facial image, such as a feature point of a nose tip on the first facial image and a feature point of a nose tip on the facial image. In this way, the first facial image exactly matches the facial image corresponding to the first facial image. Of course, the first positioning feature point and the second positioning feature point may be feature points set as required to achieve other covering effect, which is not limited in the present disclosure.

It should be understood that, the above covering the first facial image on the facial image according to coincide feature points is only an example. In practice, any covering method is applicable to the present disclosure, and is not described in detail here.

Figure 2A:
FIGS. 2a-2e are schematic diagrams showing examples for applying a method for processing a facial expression image according to an embodiment of the present disclosure.
Figure 2B:
Figure 2C:
Figure 2D:
Figure 2E:

FIGS. 2a to 2в illustrate an example of the above embodiments. As shown in FIG. 2a, the first image is acquired. The first image includes a facial image. In this example, the first image is a video frame acquired by using an image sensor, where the video frame includes the facial image. As shown in FIGS. 2a to 2e, a facial expression of the facial image is recognized, a first processing is performed on the facial image to acquire a first facial image in response to recognizing the facial expression as a first facial expression, and the first facial image is covered at a position of the facial image, to acquire a first image effect. In this example, the facial expression is the smiling expression, and the face is enlarged according to the recognized smiling expression. As shown in FIG. 2a, at first there is not smile on the face, and the image does not change. As shown in FIG. 2b, a smile appears on the face, but does not reach the degree that triggers an image effect. As shown in FIG. 2c, the degree of the smile on the face increases, and triggers the enlargement effect of the face. The enlarged face in superposed at the position of the original face, so as to highlight the smile on the face. As shown in FIGS. 2d and 2e, when the smile disappears, the enlargement effect of the face gradually disappears, and the image restores its original state.

Figure 3:
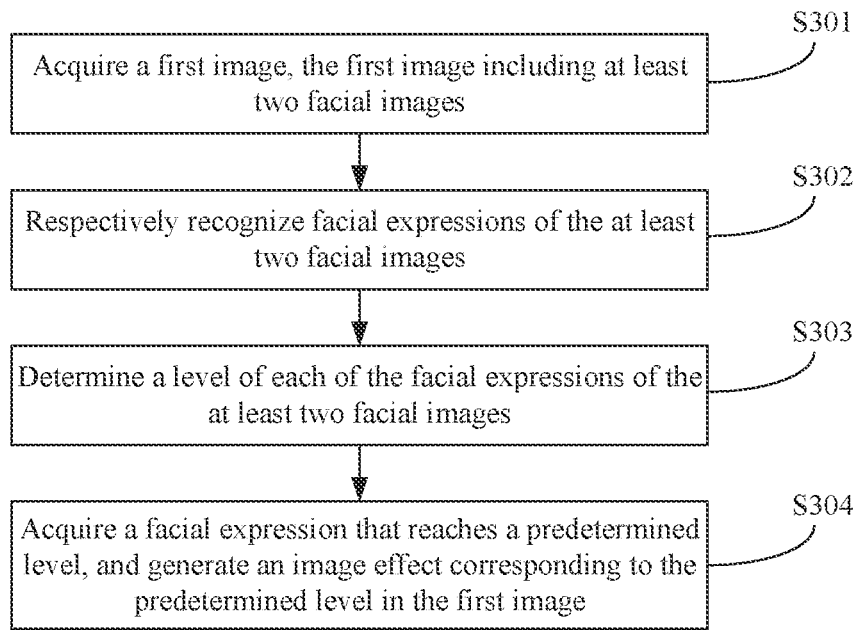
FIG. 3 is a flow char of a method for processing a facial expression image according to a second method embodiment of the present disclosure.

FIG. 3 is a flow char of a method for processing a facial expression image according to a second method embodiment of the present disclosure. The method for processing a facial expression image according to the embodiment of the present disclosure may be implemented by an apparatus for processing a facial expression image. The apparatus for processing a facial expression image may be implemented as software, or a combination of hardware and software. The apparatus for processing a facial expression image may be integrated in a device of an image processing system, such as an image processing server or a terminal device for processing an image. As shown in FIG. 3, the method includes the following steps S301 to S304.

In step S301, a first image is acquired. The first image includes at least two facial images.

In step S302, facial expressions of the at least two facial images are respectively recognized.

In step S303, in response to recognizing at least one of the facial expressions as the first facial expression, a first processing is performed on the facial image corresponding to the first facial expression to acquire at least one first facial image.

In step S304, the at least one first facial image is covered at a position of the facial image corresponding to the at least one first facial image, to acquire the first image effect.

The embodiment involves recognition of multiple faces. The first image includes multiple facial images. In this case, the processing in the first method embodiment is performed on each of the facial images. In the first image, different image effects may be achieved for different faces and different expressions in the first image.

Further, the performing, in response to recognizing at least one of the facial expressions as the first facial expression, the first processing on the facial image corresponding to the first facial expression to acquire at least one first facial image includes: in response to recognizing the at least one of the facial expressions as the first facial expression, acquiring a first processing configuration file corresponding to the first facial expression of the facial image; and performing the first processing on the facial image corresponding to the first facial expression, based on the first processing configuration file to acquire the at least one first facial image.

In the embodiment, different processing configuration files are separately set for different expression of various faces, such that difference expressions of various faces are independently processed without interfering each other.

In this step, an independent processing configuration file is generated for each expression of each face. For example, when it is determined that the first image includes 3 faces, the 3 faces are numbered as face 1, face 2 and face 3. When it is detected that the facial expression of face 1 is the smiling expression, the processing configuration file corresponding to this expression is named as face1.ID1, and an image effect is displayed according to configuration parameters in the processing configuration file. When it is detected that the facial expression of face 2 is the anger expression, the processing configuration file corresponding to this expression is named as face2.ID2, and an image effect is displayed according to configuration parameters in the processing configuration file. When it is detected that the facial expression of face 3 is the smiling expression, the processing configuration file corresponding to this expression is named as face3.ID1, and an image effect is displayed according to configuration parameters in the processing configuration file. In this case, each facial expression of each face has a separate configuration file, so as to independently configure each facial expression of each face, such that different image effects can be generated for multiple facial expressions of multiple faces.

It should be understood that, for a single face, recognition of the facial expression, determination of the level and generation of the image effect may be performed by using the solution of the first method embodiment, which is not described in detail here.

A method and an apparatus for processing a facial expression image, an electronic device and a computer readable storage medium are provided. The method for processing a facial expression image includes: acquiring a first image, the first image including a facial image; recognizing a facial expression of the facial image; performing, in response to recognizing the facial expression as a first facial expression, a first processing on the facial image to acquire a first facial image; and covering the first facial image at a position of the facial image, to acquire a first image effect. According to the embodiments of the present disclosure, generation of a facial image effect is controlled based on a facial expression, so as to solve the technical problem in the conventional technology that the image effect is complicated to produce and is fixed since the processing effect cannot be flexibly configured.

Although various steps in the method embodiments are described in the above order hereinbefore, those skilled in the art should understand that steps in the embodiments of the present disclosure are not necessary to be performed in the described order and also be performed in a reverse order, a parallel order, a crossover order or other orders. In addition, based on the above steps, those skilled in the art may also add other steps to the above steps. These distinct variations or equivalent substitutions also fall within the protection scope of the present disclosure, which is not described herein.

Figure 4:
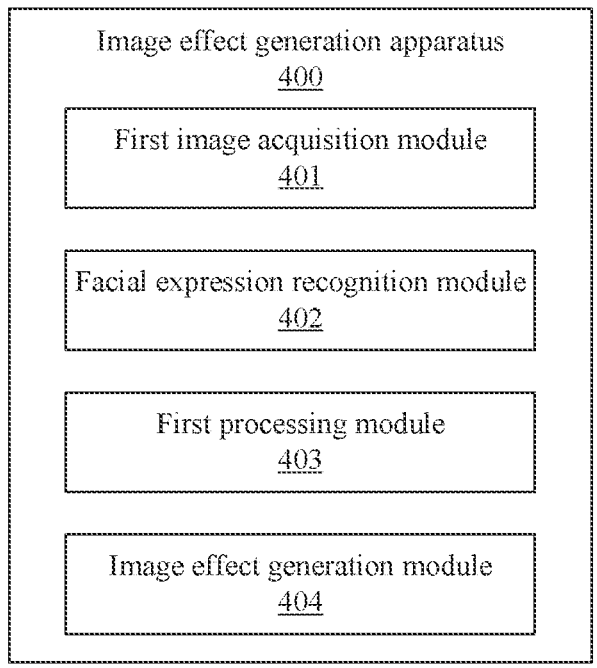
FIG. 4 is a schematic structural diagram of an apparatus for processing a facial expression image according to a first apparatus embodiment of the present disclosure.

FIG. 4 is a schematic structural diagram of an apparatus for processing a facial expression image according to a first apparatus embodiment of the present disclosure. As shown in FIG. 4, the apparatus 400 includes a first image acquisition module 401, a facial expression recognition module 402, a first processing module 403, and a facial expression image processing module 404.

The first image acquisition module 401 is configured to acquire a first image, the first image including a facial image.

The facial expression recognition module 402 is configured to recognize a facial expression of the facial image.

The first processing module 403 is configured to perform, in response to recognizing the facial expression as a first facial expression, a first processing on the facial image to acquire a first facial image.

The facial expression image processing module 404 is configured to cover the first facial image at a position of the facial image, to acquire a first image effect.

Further, the first image acquisition module 401 includes a first video acquisition module configured to acquire a first video. At least one of video frames in the first video includes the facial image.

Further, the facial expression recognition module 402 includes a face recognition module, an expression feature extraction module, and an expression recognition sub-module.

The face recognition module is configured to recognize the facial image in the first image.

The expression feature extraction module is configured to extract a feature of the facial expression from the facial image.

The expression recognition sub-module is configured to recognize the facial expression based on the feature of the facial expression.

Further, the first processing module 403 includes a processing configuration file acquisition module and a first facial image processing module.

The processing configuration file acquisition module is configured to acquire a processing configuration file corresponding to the first facial expression, in response to recognizing the facial expression as the first facial expression.

The first facial image processing module is configured to perform the first processing on the facial image based on the processing configuration file to acquire the first facial image.

Further, the processing configuration file acquisition module includes a first facial expression recognition module and a first processing configuration file acquisition module.

The first facial expression recognition module is configured to recognize the facial expression as the first facial expression.

The first processing configuration file acquisition module is configured to acquire the processing configuration file corresponding to the first facial expression, in a case that a level of the first facial expression reaches a preset level.

Further, the processing configuration file acquisition module includes a second facial expression recognition module, a second processing configuration file acquisition module, an expression level determination module, and a processing parameter setting module.

The second facial expression recognition module is configured to recognize the facial expression as the first facial expression.

The second processing configuration file acquisition module is configured to acquire the processing configuration file corresponding to the first facial expression.

The expression level determination module is configured to acquire the processing configuration file corresponding to the first facial expression.

The processing parameter setting module is configured to set a processing parameter in the processing configuration file based on the level of the first facial expression.

Further, the first facial image processing module includes a face segmentation module and an enlargement module.

The face segmentation module is configured to segment the facial image from the first image.

The enlargement module is configured to enlarge the facial image segmented from the first image based on the processing configuration file, to acquire an enlarged facial image.

Further, the facial expression image processing module 404 includes a positioning feature point acquisition module and a covering module.

The positioning feature point acquisition module is configured to acquire a first positioning feature point on the first facial image and a second positioning feature point on the facial image.

The covering module is configured to cover the first facial image on the facial image, and cause the first positioning feature point and the second positioning feature point to coincide with each other, to acquire the first image effect.

The apparatus shown in FIG. 4 may perform the method according to the embodiment shown in FIG. 1. For parts that are not described in detail in this embodiment, reference may be made to corresponding description in the embodiment shown in FIG. 1. For the processing procedure and the technical effect of the technical solution, reference may be made to the description in the embodiment shown in FIG. 1, which is not repeated here.

Figure 5:
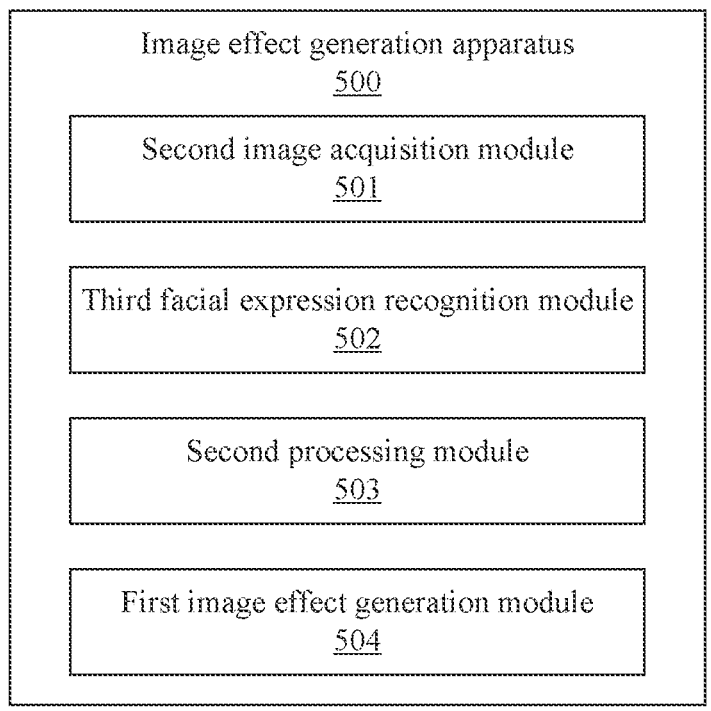
FIG. 5 is a schematic structural diagram of an apparatus for processing a facial expression image according to a second apparatus embodiment of the present disclosure.

FIG. 5 is a schematic structural diagram of an apparatus for processing a facial expression image according to a first apparatus embodiment of the present disclosure. As shown in FIG. 5, the apparatus 500 includes a second image acquisition module 501, a third facial expression recognition module 502, a second processing module 503, and a first facial expression image processing module 504.

The second image acquisition module 501 is configured to acquire the first image. The first image includes at least two facial images.

The third facial expression recognition module 502 is configured to respectively recognize facial expressions of the at least two facial images.

The second processing module 503 is configured to performing, in response to recognizing at least one of the facial expressions as the first facial expression, the first processing on the facial image corresponding to the first facial expression to acquire at least one first facial image.

The first facial expression image processing module 504 is configured to cover the at least one first facial image at a position of the facial image corresponding to the at least one first facial image, to acquire the first image effect.

Further, the second processing module 503 includes a corresponding processing configuration file acquisition module and a second processing sub-module.

The corresponding processing configuration file acquisition module is configured to, in response to recognizing the at least one of the facial expressions as the first facial expression, acquire a first processing configuration file corresponding to the first facial expression of the facial image.

The second processing sub-module is configured to perform the first processing on the facial image corresponding to the first facial expression, based on the first processing configuration file to acquire the at least one first facial image.

The apparatus shown in FIG. 5 may perform the method according to the embodiment shown in FIG. 3. For parts that are not described in detail in this embodiment, reference may be made to corresponding description in the embodiment shown in FIG. 3. For the processing procedure and the technical effect of the technical solution, reference may be made to the description in the embodiment shown in FIG. 3, which is not repeated here.

Figure 6:
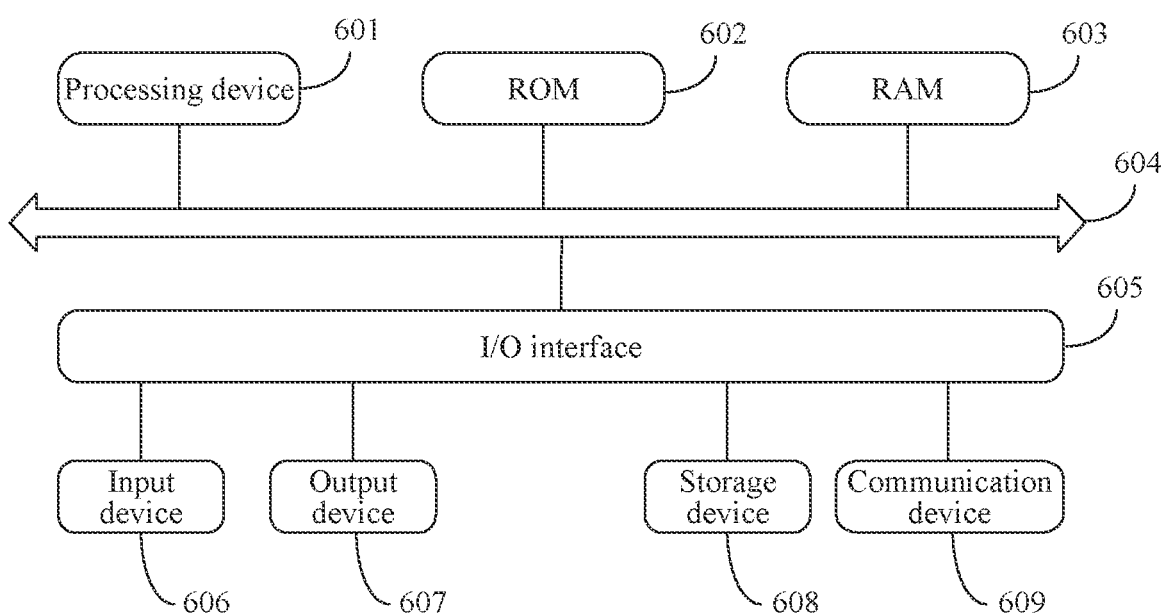
FIG. 6 is a schematic structural diagram of an electronic device according to an embodiment of the present disclosure.

FIG. 6 is a schematic structural diagram of an electronic apparatus 600 applicable for implementing the embodiments of the present disclosure. The electronic apparatus according to the embodiment of the present disclosure may include but is not limited to a mobile terminal such as a mobile phone, a laptop computer, a digital broadcast receiver, a PDA (personal digital assistant), a PAD (tablet computer), a PMP (portable multimedia player) and a vehicle terminal (for example, a vehicle terminal), and a fixed terminal such as a digital TV and a desktop computer. The electronic apparatus shown in FIG. 6 is only an example and should not impose any limitations on the functions and the scope of use of the embodiments of the present disclosure.

As shown in FIG. 6, the electronic apparatus 600 may include a processing device (for example, a central processing unit, a graphics processing unit and the like) 601. The processing device 601 may perform various proper actions and processing based on a grogram stored in a read-only memory (ROM) 602 or a program loaded from a storage device 608 to a random-access memory (RAM) 603. The RAM 603 further stores various programs and data for an operation of the electronic apparatus 600. The processing device 601, the ROM 602 and the RAM 603 are connected to each other through a bus 604. An input/output (I/O) interface 605 is also connected to the bus 604.

Generally, the following may be connected to the I/O interface 605: an input device 606 such as a touch screen, a touch pad, a keyboard, a mouse, an image sensor, a microphone, an accelerometer, a gyroscope, an output device 607 such as a liquid crystal display (LCD), a speaker, a vibrator, a storage device 608 such as a magnetic tape, a hard disk, and a communication device 609. Based on the communication device 609, the electronic device 600 may communicate with other devices through wired or wireless communication to exchange data. Although FIG. 6 shows the electronic apparatus 600 including various devices, it should be understood that not all shown devices are required to be implemented or included. The shown devices may be replaced by other devices, or more or less devices may be included.

According to the embodiments of the present disclosure, the process described above in conjunction with the flowchart may be implemented as a computer software program. For example, the embodiments of the present disclosure include a computer program product. The computer program product includes a computer program stored in a computer readable medium. The computer program includes program codes for performing the method shown in the flowchart. In such embodiments, the computer program may be downloaded and installed from the network through the communication device 609, installed from the storage device 608, or installed from the ROM 602. The computer program, when being executed by the processing device 601, performs functions defined in the method according to the embodiments of the present disclosure.

It should be noted that the computer readable medium according to the embodiments of the present disclosure may be a computer readable signal medium, a computer readable storage medium or any combination of the computer readable signal medium and the computer readable storage medium. For example, the computer readable storage medium may be, but is not limited to, an electronic, magnetic, optical, electromagnetic, infrared, or semiconductor system, apparatus, or device, or any combination of the above. In addition, the computer readable storage medium may also include but is not limited to: electrical connections having at least one wire, a portable computer disk, a hard disk, a random access memory (RAM), a read only memory (ROM), erasable programmable read-only memory (EPROM or a flash memory), an optical fiber, a portable compact disc read-only memory (CD-ROM), a light storage device, a magnetic storage device, or any suitable combination of the above. In the present disclosure, the computer readable storage medium may be any physical medium including or storing a program. The program may be used by an instruction execution system, an instruction execution apparatus or an instruction execution device or may be used in combination with the instruction execution system, the instruction execution apparatus and the instruction execution device. In the present disclosure, the computer readable signal medium may include a data signal transmitted in a baseband or transmitted as a part of a carrier wave. The data signal carries computer readable program codes. The transmitted data signal may has a variety of forms including, but not limited to, an electromagnetic signal, an optical signal, or any suitable combination of the above. The computer readable signal medium may also be any other computer readable medium except for the computer readable storage medium. The computer readable medium can send, transmit or transfer programs used by an instruction execution system, an instruction execution apparatus and an instruction execution device or used in combination with the instruction execution system, the instruction execution apparatus and the instruction execution device. The program codes included in the computer readable medium may be transferred through any proper medium including, but not limited to, wireless, an electric wire, an optical cable, RF and any proper combination of the above.

The computer readable medium may be included in the electronic apparatus. Alternatively, the computer readable medium may exist independently and not assembled in the electronic apparatus.

The computer readable medium may carry one or more programs. The electronic apparatus, when executing the one or more programs, acquires a first image, the first image including a facial image; recognizes a facial expression of the facial image; performs, in response to recognizing the facial expression as a first facial expression, a first processing on the facial image to acquire a first facial image; and cover the first facial image at a position of the facial image, to acquire a first image effect.

The computer program codes for performing the operations according to the present disclosure may be written in at least one programming language or a combination of the at least one programming language. The programming language includes an object oriented programming language such as Java, Smalltalk, C++ and a conventional procedural programming language such as "C" programming language or a programming language similar to "C" programming language. The program codes may be completely executed on a user computer, partially executed on the user computer, executed as a standalone software package, partially executed on the user computer and partially executed on a remote computer, completely executed on the remote computer or a server. In the cases relating to the remote computer, the remote computer may be connected to the user computer via any kind of networks including Local Area Network (LAN) or Wide Area Network (WAN), or the remote computer may be connected to an external computer (for example, via Internet provided by an Internet service provider).

The flowcharts and block diagrams in the drawings show architectures, functions and operations that may be realized with the systems, methods and computer program products according to the embodiments of the present disclosure. Each block in the flowcharts or block diagrams may represent a module, a program segment or a part of codes. The module, the program segment or the part of codes includes one or more executable instructions for implementing a specified logical function. It should be noted that in some substitution implementations, a function indicated in the block may also occur in an order different from that indicated in the drawings. For example, two steps respectively indicated in two blocks that are connected to each other in an order may be implemented in parallel. Sometimes the two steps may be implemented in a reverse order, which depends on a function related to the steps. It should also be noted that each block in the block diagrams and/or flowcharts and a combination of blocks in the block diagrams and/or flowcharts may be implemented by a special hardware-based system for performing a specified function or operation or implemented by a combination of a special hardware and a computer instruction.

Units described in the embodiments of the present disclosure may be implemented through software or hardware. Names of the units do not limit the units in some cases.

The above descriptions are only preferred embodiments of the present disclosure and explanations of the technical principles of the present disclosure. Those skilled in the art should understand that the scope of the present disclosure is not limited to a technical solution formed by combining the above technical features in a specific manner and should cover other technical solutions formed by combining the above technical features or equivalent features of the above technical features in an arbitrary manner without departing from the conception of the present disclosure. For example, the scope of the present disclosure covers a technical solution formed by replacing one of the above features by a technical feature with a similar function disclosed in (but not limited to) the present disclosure.

The invention claimed is:

1. A computer-implemented method for generating image effects, comprising:
   acquiring a first image, the first image comprising a facial image;
   recognizing a facial expression of the facial image;
   performing, in response to recognizing the facial expression as a first facial expression, a first processing on the facial image to acquire a first facial image, wherein the performing the first processing on the facial image to acquire a first facial image comprises:
      computing a position of a pixel in the facial image based on segmenting the facial image from the first image and enlarging the segmented facial image,
      assigning a color value to the pixel in the segmented and enlarged facial image based at least in part on a color value of the pixel in the facial image, and
      generating a new facial image as the first facial image based on the segmented and enlarged facial image with assigned color values; and
   superposing the first facial image on the facial image to generate a first image effect.

2. The method for processing a facial expression image according to claim 1, wherein the acquiring a first image, the first image comprising a facial image comprises:

acquiring a first video, wherein at least one of video frames in the first video comprises the facial image.

3. The method for processing a facial expression image according to claim 1, wherein the recognizing a facial expression of the facial image comprises:
recognizing the facial image in the first image;
extracting a feature of the facial expression from the facial image; and
recognizing the facial expression based on the feature of the facial expression.

4. The method for processing a facial expression image according to claim 1, wherein the performing, in response to recognizing the facial expression as a first facial expression, a first processing on the facial image to acquire a first facial image comprises:
acquiring a processing configuration file corresponding to the first facial expression, in response to recognizing the racial expression as the first facial expression; and
performing the first processing on the facial image based on the processing configuration file to acquire the first facial image.

5. The method for processing a facial expression image according to claim 4, wherein the acquiring a processing configuration file corresponding to the first facial expression, in response to recognizing the facial expression as the first facial expression comprises:
recognizing the facial expression as the first facial expression; and
acquiring the processing configuration file corresponding to the first facial expression, in a case that a level of the first facial expression reaches a preset level.

6. The method for processing a facial expression image according to claim 4, wherein the acquiring a processing configuration file corresponding to the first facial expression, in response to recognizing the facial expression as the first facial expression comprises:
recognizing the facial expression as the first facial expression;
acquiring the processing configuration file corresponding to the first facial expression;
determining a level of the first facial expression; and
setting a processing parameter in the processing configuration file based on the level of the first facial expression.

7. The method for processing a facial expression image according to claim 4, wherein the performing the first processing on the facial image based on the processing configuration file to acquire the first facial image comprises:
segmenting the facial image from the first image; and
enlarging the facial image segmented from the first image based on the processing configuration file, to acquire an enlarged facial image.

8. The method for processing a facial expression image according to claim 1, wherein the covering the first facial image at a position of the facial image, to acquire a first image effect comprises:
acquiring a first positioning feature point on the first facial image and a second positioning feature point on the facial image; and
covering the first facial image on the facial image, and causing the first positioning feature point and the second positioning feature point to coincide with each other, to acquire the first image effect.

9. The method for processing a facial expression image according to claim 1, wherein the acquiring a first image, the first image comprising a facial image comprises:
acquiring the first image, the first image comprising at least two facial images.

10. The method for processing a facial expression image according to claim 9, wherein the recognizing a facial expression of the facial image comprises:
respectively recognizing facial expressions of the at least two facial images.

11. The method for processing a facial expression image according to claim 10, wherein the performing, in response to recognizing the facial expression as a first facial expression, a first processing on the facial image to acquire a first facial image comprises:
performing, in response to recognizing at least one of the facial expressions as the first facial expression, the first processing on the facial image corresponding to the first facial expression to acquire at least one first facial image.

12. The method for processing a facial expression image according to claim 11, wherein the performing, in response to recognizing at least one of the facial expressions as the first facial expression, the first processing on the facial image corresponding to the first facial expression to acquire at least one first racial image comprises:
in response to recognizing the at least one or the facial expressions as the first facial expression, acquiring a first processing configuration file corresponding to the first facial expression of the facial image; and
performing the first processing on the facial image corresponding to the first facial expression, based on the first processing configuration file to acquire the at least one first facial image.

13. The method for processing a facial expression image according to claim 11, wherein the covering the first facial image at a position of the facial image, to acquire a first image effect comprises:
covering the at least one first facial image at a position of the facial image corresponding to the at least one first facial image, to acquire the first image effect.

14. An electronic device, comprising:
at least one processor; and
at least one memory configured for storing at least one program, wherein the at least one program, when executed by the at least one processor, causes the at least one processor to perform operations comprising:
acquiring a first image, the first image comprising a facial image;
recognizing a facial expression of the facial image;
performing, in response to recognizing the facial expression as a first facial expression, a first processing on the facial image to acquire a first facial image, wherein the performing the first processing on the facial image to acquire a first facial image comprises:
computing a position of a pixel in the facial image based on segmenting the facial image from the first image and enlarging the segmented facial image,
assigning a color value to the pixel in the segmented and enlarged facial image based at least in part on a color value of the pixel in the facial image, and
generating a new facial image as the first facial image based on the segmented and enlarged facial image with assigned color values; and
superposing the first facial image on the facial image to generate a first image effect.

15. A non-transitory computer readable storage medium configured to store non-transitory computer readable instructions, the non-transitory computer readable instructions, when executed by a computer, causing the computer to perform operations comprising:
    acquiring a first image, the first image comprising a facial image;
    recognizing a facial expression of the facial image;
    performing, in response to recognizing the facial expression as a first facial expression, a first processing on the facial image to acquire a first facial image, wherein the performing the first processing on the facial image to acquire a first facial image comprises:
        computing a position of a pixel in the facial image based on segmenting the facial image from the first image and enlarging the segmented facial image,
        assigning a color value to the pixel in the segmented and enlarged facial image based at least in part on a color value of the pixel in the facial image, and
        generating a new facial image as the first facial image based on the segmented and enlarged facial image with assigned color values; and
    superposing the first facial image on the facial image to generate a first image effect.

16. The method for processing a facial expression image according to claim 12, wherein the covering the first facial image at a position of the facial image, to acquire a first image effect comprises:
    covering the at least one first facial image at a position of the facial image corresponding to the at least one first facial image, to acquire the first image effect.

17. The electronic device according to claim 14, wherein the recognizing a facial expression of the facial image comprises:
    recognizing the facial image in the first image;
    extracting a feature of the facial expression from the facial image; and
    recognizing the facial expression based on the feature of the facial expression.

18. The electronic device according to claim 14, wherein the performing, in response to recognizing the facial expression as a first facial expression, a first processing on the facial image to acquire a first facial image comprises:
    acquiring a processing configuration file corresponding to the first facial expression, in response to recognizing the facial expression as the first facial expression; and
    performing the first processing on the facial image based on the processing configuration file to acquire the first facial image.

19. The electronic device according to claim 18, wherein the acquiring a processing configuration file corresponding to the first facial expression, in response to recognizing the facial expression as the first facial expression comprises:
    recognizing the facial expression as the first facial expression; and
    acquiring the processing configuration file corresponding to the first facial expression, in a case that a level of the first facial expression reaches a preset level.

20. The electronic device according to claim 18, wherein the acquiring a processing configuration file corresponding to the first facial expression, in response to recognizing the facial expression as the first facial expression comprises:
    recognizing the facial expression as the first facial expression;
    acquiring the processing configuration file corresponding to the first facial expression;
    determining a level of the first facial expression; and
    setting a processing parameter in the processing configuration file based on the level of the first facial expression.

* * * * *